United States Patent
Sato

(10) Patent No.: US 7,422,140 B2
(45) Date of Patent: Sep. 9, 2008

(54) FRICTION STIR SPOT JOINING DEVICE

(75) Inventor: Yoshio Sato, Ayase (JP)

(73) Assignee: Obara Corporation, Kanagawa-ken (JP)

( * ) Notice: Subject to any disclaimer, the term of this patent is extended or adjusted under 35 U.S.C. 154(b) by 322 days.

(21) Appl. No.: 11/312,160

(22) Filed: Dec. 20, 2005

(65) Prior Publication Data

US 2007/0040007 A1 Feb. 22, 2007

(30) Foreign Application Priority Data

Aug. 22, 2005 (JP) ............................ 2005-239636

(51) Int. Cl.
*B23K 20/12* (2006.01)
(52) U.S. Cl. .................. 228/2.1; 228/112.1
(58) Field of Classification Search .............. 228/2.1, 228/112.1, 114.5; 156/73.5
See application file for complete search history.

(56) References Cited

U.S. PATENT DOCUMENTS

| 5,697,544 | A | * | 12/1997 | Wykes ..................... 228/2.1 |
| 5,893,507 | A | * | 4/1999 | Ding et al. ................ 228/2.1 |
| 6,603,228 | B1 | * | 8/2003 | Sato ........................ 310/83 |
| 7,121,451 | B2 | * | 10/2006 | Kano et al. .............. 228/112.1 |

FOREIGN PATENT DOCUMENTS

JP 2002-178168 6/2002

* cited by examiner

*Primary Examiner*—Jerry Lorengo
*Assistant Examiner*—Nicholas P D'Aniello
(74) *Attorney, Agent, or Firm*—Flynn, Thiel, Boutell & Tanis, P.C.

(57) ABSTRACT

There is provided a friction stir spot joining device in which a pin can be simply and surely caused to come into or out from a tip end of a joining tool by driving a pin extraction motor when the pin extraction motor is used so as to cause the pin to come into or out from the tip end of the joining tool. The friction stir spot joining device for softening and stirring works to be joined due to frictional heat generated by the rotation of the pin so as to perform spot joining contains a stirring motor for rotating the joining tool having the pin, a pressure application motor for linearly driving the joining tool so as to cause the pin to come in or come out from a tip end of the joining tool and a pin extraction motor disposed at the rear of the stirring motor on the same axis line as the stirring motor, while being integrated with the stirring motor, for causing the pin to come in or come out from a tip end of the joining tool, wherein the pressure application motor is disposed in parallel with the pin extraction motor and a pressure application screw shaft, operated by the pressure application motor, is disposed on the same axis line as the pin extraction motor.

4 Claims, 2 Drawing Sheets

FRICTION STIR SPOT JOINING DEVICE

FIELD OF THE INVENTION

The invention relates to a friction stir spot joining device for softening and stirring works to be joined due to frictional heat generated by the rotation of a pin so as to perform spot joining, which comprises a stirring motor for rotating a joining tool having the pin, and a pressure application motor for linearly driving the joining tool, wherein the pin is caused to come in or come out from the tip end of the joining tool.

RELATED ART

There has been conventionally a friction stir spot joining device for softening and stirring works to be joined due to frictional heat generated by the rotation of a pin so as to perform spot joining, which comprises a stirring motor for rotating a joining tool having the pin, and a pressure application motor for linearly driving the joining tool, wherein the pin is caused to come in or come out from the tip end of the joining tool, and wherein a spring is interposed between a rotor serving as the joining tool and a holder which is fixedly secured to the upper end portion of the pin, and the pin is caused to come in or come out from the tip end of the joining tool by the agency of a force of the spring (for example, as disclosed in JP 2002-178168A).

However, the foregoing prior art device has a problem in that although the spring is operated so as to cause the pin to come in or come out from the tip end of the joining tool, a mechanism for operating the spring is very complex and the operating timing thereof is limited, and it is difficult to cause the pin to surely come in or come out from the tip end of the joining tool by the agency of a force of the spring.

SUMMARY OF THE INVENTION

The invention has been made in view of the problem of the prior art device, and it is an object of the present invention to provide a friction stir spot joining device employing a motor for extracting a pin so as to cause the pin to come in or come out from the tip end of a joining tool, wherein the pin can simply and surely come into or out from the tip end of the joining tool by driving the pin extraction motor.

To achieve the above object, the friction stir spot joining device according to the first aspect of the invention is characterized in comprising a pin extraction motor which is disposed at the rear of a stirring motor on the same axis line as the stirring motor while integrated therewith, wherein a pressure application motor is disposed in parallel with the pin extraction motor, and a pressure application screw shaft to be operable by the pressure application motor is disposed on the same axis line as the pin extraction motor.

The friction stir spot joining device according to the second aspect of the invention is characterized in further comprising a direct action bearing rail disposed inside a driving unit body for housing therein the integrated pin extraction motor and stirring motor, and a direct action bearing body fixedly secured to the pin extraction motor being retained by the direct action bearing rail.

The friction stir spot joining device according to the third aspect of the invention is characterized in further comprising a mechanical component which is disposed between an output shaft side of the stirring motor and a pin holding member for enabling the transmission of the rotating force of the stirring motor and a relative movement in the axial direction between the stirring motor and the pin holding member.

The friction stir spot joining device according to the fourth aspect of the invention is characterized in that an output shaft of the pin extraction motor is rendered hollow.

According to the friction stir spot joining device of the invention, since the pin extraction motor is disposed at the rear of the stirring motor on the same axis line as the stirring motor while integrated therewith, and the pressure application motor is disposed in parallel with the pin extraction motor, it is possible to realize a friction stir spot joining device wherein the pin can be surely and easily come in or come out from the joining tool arbitrarily at any timing, and a mechanism for operating the pin can be very simplified compared with the conventional device.

Further, in cases where the direct action bearing rail is disposed inside the driving unit body for housing the integrated pin extraction motor and stirring motor, and the direct action bearing body fixedly secured to the pin extraction motor is retained by the direct action bearing rail, it is possible to realize a friction stir spot joining device wherein the pin extraction motor and stirring motor can be accurately moved in an accompanied state.

Still further, in cases where a mechanical component, such as a spline or sliding key, enabling the transmission of the rotating force of the stirring motor and the relative movement in the axial direction between the stirring motor and the pin holding member is disposed between the output shaft side of the stirring motor and the pin holding member, it is possible to realize a friction stir spot joining device wherein the rotating force of the stirring motor is surely transmitted to the pin, and the pin can be moved arbitrarily and accurately in the axial direction by the pin extraction motor relative to the joining tool.

Yet further, in cases where the output shaft of the pin extraction motor is rendered hollow, a part of the power transmission mechanism of the pressure application motor can be inserted in the hollow part of the output shaft of the pin extraction motor, so that it is possible to realize a friction stir spot joining device having a reduced entire length thereof.

PREFERRED EMBODIMENT OF THE INVENTION

Figure 1:
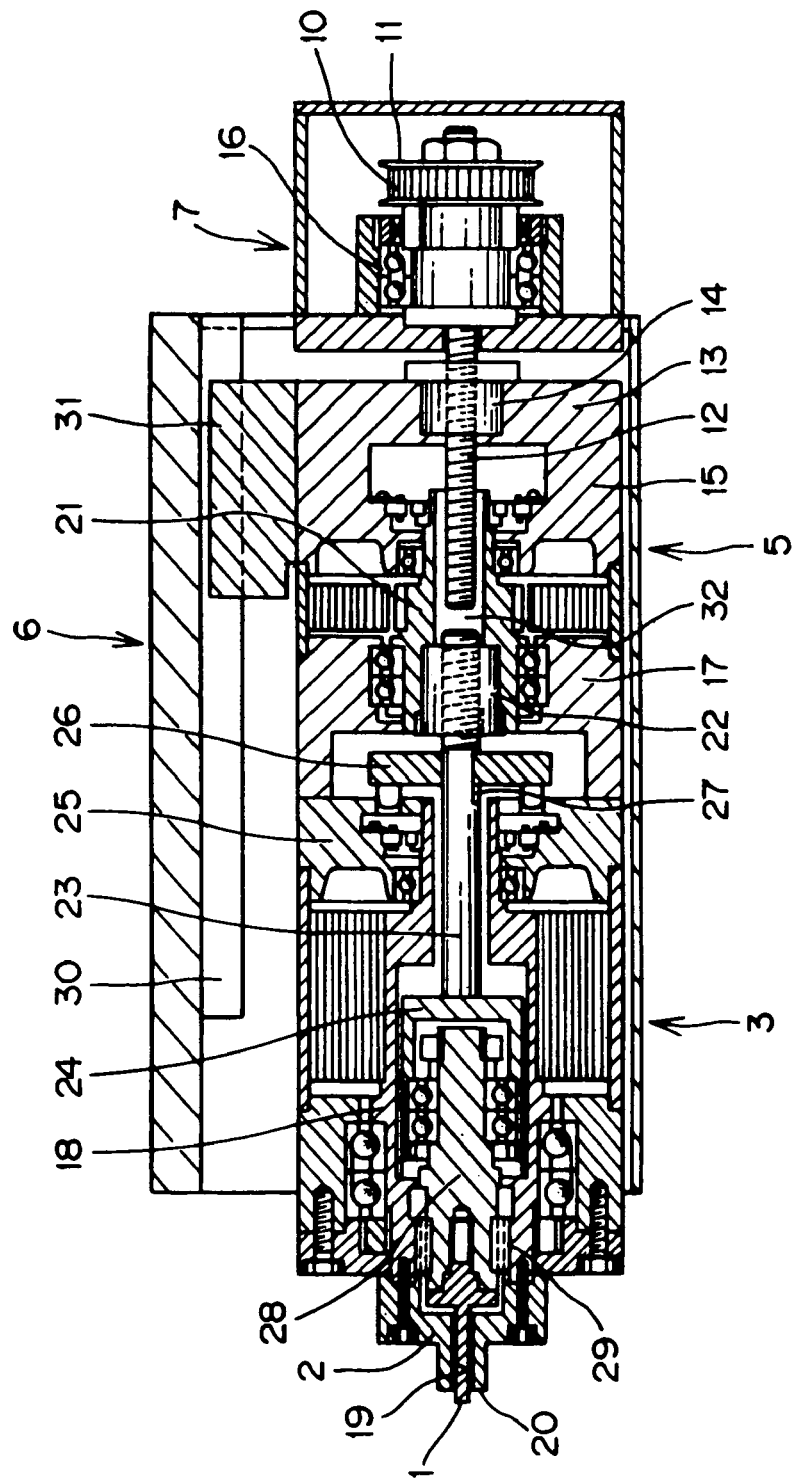
FIG. 1 is a sectional view showing a schematic configuration of a friction stir spot joining device according to an embodiment of the invention.
Figure 2:
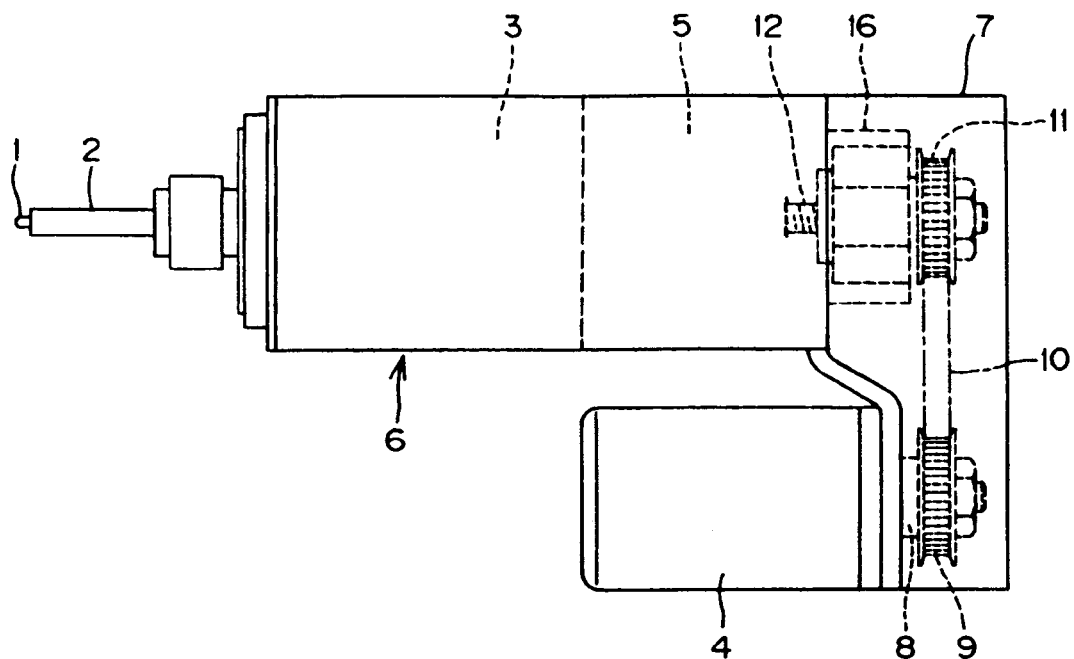
FIG. 2 is a plan view showing the schematic configuration of the friction stir spot joining device in FIG. 1.

FIGS. 1 and 2 are sectional and plan views each showing a schematic configuration of a friction stir spot joining device adapted for working the present invention. The friction stir spot joining device is a device for softening and stirring works to be joined due to frictional heat generated by the rotation of a pin 1 so as to perform spot joining. The friction stir spot joining device is provided with a stirring motor 3 for rotating a joining tool 2 having the pin 1 and a pressure application motor 4 for linearly driving the joining tool 2, wherein the pin 1 is caused to come in or come out from the tip end of the joining tool 2, and a pin extraction motor 5 for causing the pin 1 to come in or come out from the tip end of the joining tool 2 is disposed at the rear of the stirring motor 3 on the same axis line as the stirring motor 3 while integrated therewith, and the pressure application motor 4 is disposed in parallel with the pin extraction motor 5.

First Embodiment (FIGS. 1 and 2)

In the friction stir spot joining device, the pin 1 is inserted in a joining point of a work to be joined (not shown), and a part of the work to be joined is softened and stirred owing to a frictional heat caused by the rotation of the pin 1, thereby performing spot joining. The friction stir spot joining device is roughly structured as follows.

A pressure application motor 4 and a transmission box 7 of the pressure application motor 4 are fixedly secured to a driving unit body 6 which is fitted to a wrist of a robot (not shown), and a rotating force from an output shaft 8 of the pressure application motor 4 is transmitted to a pressure application screw shaft 12 by way of a pulley 9, a transmission belt 10 and a pully 11, respectively housed in the transmission box 7. A pressure application member 13 is provided with a nut 14 threading with a screw of the pressure application screw shaft 12 at one end side thereof and fixedly secured to a rear wall 15 of the pin extraction motor 5 at the other end side thereof.

The pressure application motor 4 is disposed in parallel with the pin extraction motor 5, and the pressure application screw shaft 12 to be operable by the pressure application motor 4 is disposed on the same axis line as the pin extraction motor 5. Depicted by 16 is a bearing of the pressure application screw shaft 12.

The pin extraction motor 5 and the stirring motor 3 are connected to each other by a front side flange 17 of the pin extraction motor 5, and the pin extraction motor 5 is disposed at the rear of the stirring motor 3 on the same axis line as the stirring motor 3 while integrated therewith.

The joining tool 2 is fitted to the tip end portion of an output shaft 18 of the stirring motor 3, and the pin 1 is inserted in a hole 19 of the joining tool 2 provided at the central axis line, wherein the tip end of the pin 1 is caused to come in or come out from a shoulder section 20 provided at the tip end of the joining tool 2 when the pin extraction motor 5 is driven.

A nut 22 is fixedly secured to an output shaft 21 of the pin extraction motor 5, and a bearing case 24 is connected to the tip end of a screw shaft 23 which threads with the nut 22, wherein the screw shaft 23 is not rotated by a spline key connection 27 relative to a rotation stop member 26 which is fixedly secured to a rear wall 25 of the stirring motor 3.

The bearing case 24 is disposed inside the hollow output shaft 18 of the stirring motor 3, and a pin holding member 28 for holding the pin 1 is disposed inside the bearing case 24 via a spline key 29 so as to be freely rotatable together with the output shaft 18. A rear end of the pin 1 is screwed into and fixedly secured to the tip end of the pin holding member 28.

With the friction stir spot joining device having the configuration set forth above, an entire friction stir spot joining device is first moved by a robot to a position confronting a predetermined joining point of the work to be joined.

Here, when the stirring motor 3 and the pressure application motor 4 are driven, the pin extraction motor 5 and the stirring motor 3 advance at the same time toward the joining point of the work to be joined due to the rotation of the pressure application screw shaft 12 by the pressure application motor 4, and the joining tool 2 and the pin 1 are rotated together by the rotation of the stirring motor 3. At this time, the tip end of the pin 1 is rendered in state where the tip end of the pin 1 protrudes from the shoulder section 20 of the rotating joining tool 2.

At the time when the shoulder section 20 of the joining tool 2 is brought into intimate contact with the surface of the work to be joined by the pressure application motor 4, the pin 1 is inserted onto the work to be joined, in a rotating state at the joining point and, at this point in time, the driving of the pressure application motor 4 is stopped, while there occurs friction between the pin 1 and the work to be joined owing to the rotation of the pin 1 by the stirring motor 3, thereby melting and stirring a part of the work to be joined, and the molten object performs spot joining of the work to be joined.

When the work to be joined is subjected to spot joining, the pin extraction motor 5 is driven so that the pin 1 is extracted from the joining point of the work to be joined and reaches the position which is the same level as the shoulder section 20 of the joining tool 2 or further extracted toward the inside of the hole 19. Since the stirring motor 3 is rotated during the extraction of the pin 1, the shoulder section 20 of the rotating joining tool 2 operates to smooth the surface of the work to be joined at the joining point.

Since the pin 1 is caused to come in or come out arbitrarily relative to the shoulder section 20 of the joining tool 2 by independently driving the pin extraction motor 5, irrespective of the driving of the pressure application motor 4 and the stirring motor 3, the pin extraction motor 5 may be operated, if need be, depending on the conditions of the molten object at the joining point.

In the friction stir spot joining device according to the first embodiment, since the pin extraction motor 5 is disposed at the rear of the stirring motor 3 on the same axis line as the stirring motor 3 while being integrated with the stirring motor 3, and the pressure application motor 4 is disposed in parallel with the pin extraction motor 5, the pin 1 can surely and easily come in or come out from the joining tool 2 arbitrarily at any timing, thereby realizing a friction stir spot joining device which is very simplified in a mechanism for operating the pin compared with a conventional device, and can be shortened in its entire length while being provided with the pin extraction motor 5.

Second Embodiment

In the friction stir spot joining device according to the first embodiment, a direct action bearing rail 30 is disposed inside a driving unit body 6 and a direct action bearing body 31 fixedly secured to a pin extraction motor 5 is retained by the direct action bearing rail 30.

Thus, in cases where the direct action bearing rail 30 is disposed inside the driving unit body 6 and the direct action bearing body 31 fixedly secured to the pin extraction motor 5 is retained by the direct action bearing rail 30, it is possible to realize a friction stir spot joining device wherein the pin extraction motor 5 and the stirring motor 3 can be accurately moved while they are accompanied with each other.

Third Embodiment

Figure 3:
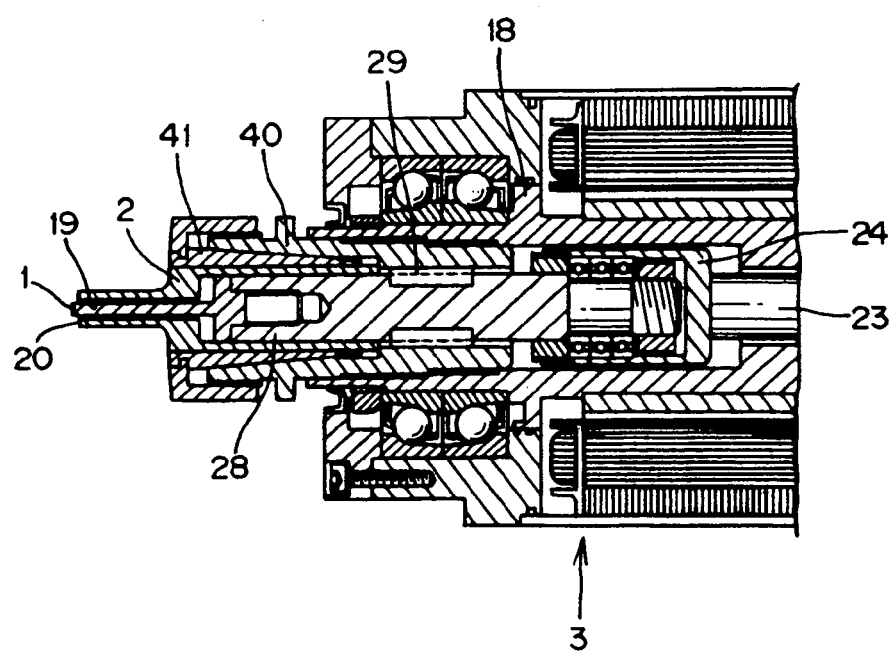
FIG. 3 is a view showing a schematic configuration of a main portion of a friction stir spot joining device according to another embodiment of the invention.

Further in the friction stir spot joining device according to the first embodiment, there is provided between an output shaft 18 of a stirring motor 3 and a pin holding member 28 a mechanical component such as a spline key 29 for enabling the transmission of the rotating force of the stirring motor to the pin 1 and the relative movement in the axial direction between the stirring motor 3 and the pin holding member 28, or as shown in FIG. 3, a holder 40 of a joining tool 2 is disposed between an output shaft 18 of a stirring motor 3 and the joining tool 2, and a mechanical component such as a spline key 29 enabling the transmission of the rotating force (of the stirring motor to the pin 1) and the relative movement in the axial direction is disposed between the holder 40 and a pin holding member 28.

In FIG. 3, the holder 40 of the joining tool 2 is engaged in the output shaft 18 of the stirring motor 3 by a collet 41, and there is disposed between the holder 40 and the pin holding member 28 a mechanical component such as the spline key 29 enabling the transmission of the rotating force and the relative movement in the axial direction. Other constituent components are substantially the same as those in FIG. 1, they are depicted by the same reference numerals, and the explanation thereof is omitted.

Thus, in cases where there is disposed the mechanical component for enabling the transmission of the rotating force of the stirring motor and the relative movement in the axial direction between the output shaft 18 side of the stirring motor 3 and the pin holding member 28, it is possible to realize a friction stir spot joining device wherein the rotating force from the stirring motor 3 to the pin 1 is surely transmitted and also the pin 1 can be moved arbitrarily and accurately in the axial direction by the pin extraction motor 5 toward the joining tool 2.

Fourth Embodiment

Still further, in the friction stir spot joining device according to the first embodiment, an output shaft 21 of a pin extraction motor 5 is rendered hollow to form a hollow portion 32, and the tip end side of a screw shaft 12 serving as a part of a power transmission mechanism of a pressure application motor 4 can be inserted in the hollow portion 32.

Thus, in cases where the output shaft 21 of the pin extraction motor 5 is rendered hollow to form the hollow portion 32, the tip end side of the screw shaft 12 serving as a part of a power transmission mechanism of the pressure application motor 4 can be inserted in the hollow portion 32 of the output shaft 21 of the pin extraction motor 5, it is possible to realize a friction stir spot joining device capable of reducing the entire length thereof. Meanwhile, in the cases where a stroke of the joining tool 2 is relatively large, the friction stir spot joining device may be structured such that a screw shaft 23 from the pin extraction motor 5 is also rendered hollow and the screw shaft 12 is long and narrow so as to also position the tip end of the screw shaft 12 from the pressure application motor 4 in the screw shaft 23.

What is claimed is:

1. A frictional stir spot joining device for softening and stirring workpieces to be joined by frictional heat generated by rotation of a pin, comprising: a stirring motor for rotating a joining tool holding the pin; a pressure application motor for linearly driving the joining tool through a pressure application screw; and a pin extraction motor disposed at the rear of the stirring motor on the same axis line as and integrated with the stirring motor for causing the pin to move axially in and out of a tip end portion of the joining tool, wherein the pressure application motor is disposed in parallel with the pin extraction motor and the pressure application screw shaft is disposed on the same axis line as the pin extraction motor.

2. A friction stir spot joining device according to claim 1, further comprising a direct action bearing rail disposed inside a driving unit body which houses therein the integrated pin extraction motor and the stirring motor and a direct action bearing body fixedly secured to the pin extraction motor and retained by the direct action bearing rail.

3. A friction stir spot joining device according to claim 1, further comprising a mechanical component disposed between an output shaft side of the stirring motor and a pin holding member for enabling the transmission of the rotating force of the stirring motor to the pin and a relative movement in the axial direction between the stirring motor and the pin holding member.

4. A friction stir spot joining device according to claim 1, wherein the pin extraction motor has a hollow output shaft.

* * * * *